W. V. TURNER.
EMERGENCY VALVE DEVICE.
APPLICATION FILED MAY 16, 1912.
1,120,765.
Patented Dec. 15, 1914.
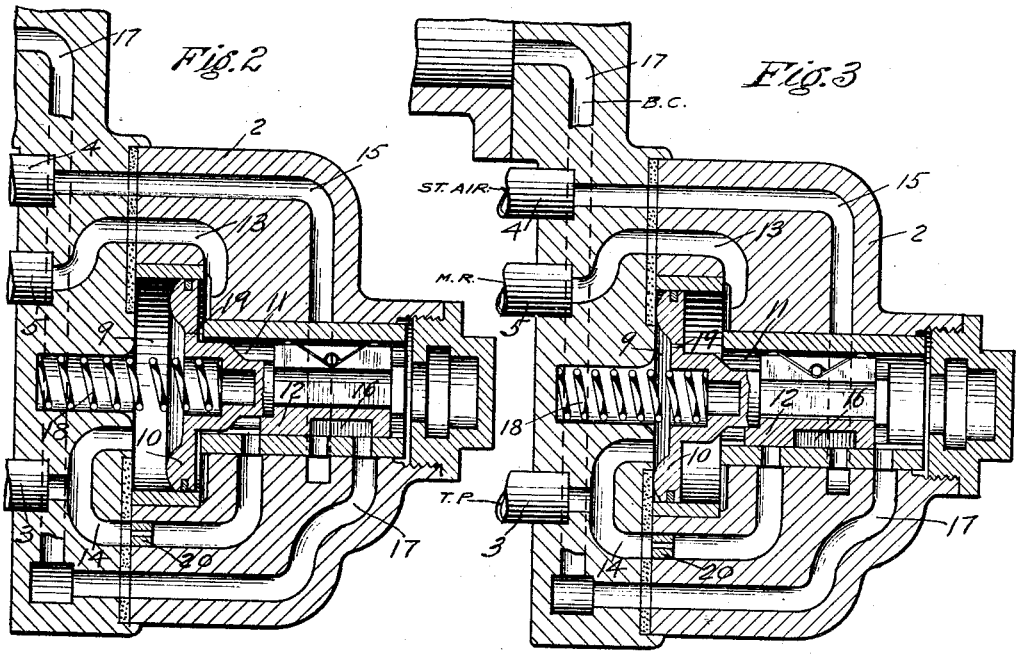
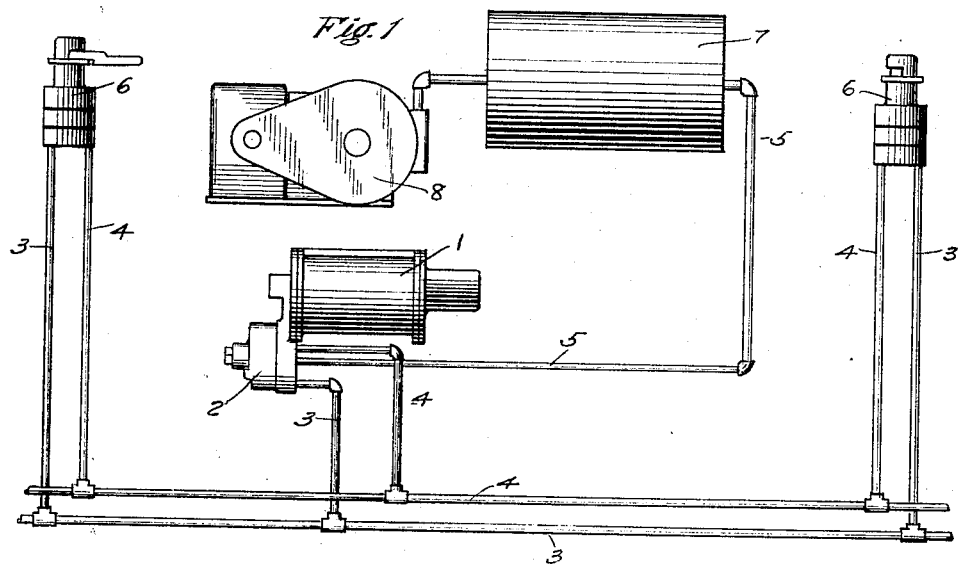

UNITED STATES PATENT OFFICE.

WALTER V. TURNER, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

EMERGENCY-VALVE DEVICE.

1,120,765.  Specification of Letters Patent.  Patented Dec. 15, 1914.

Application filed May 16, 1912. Serial No. 697,723.

*To all whom it may concern:*

Be it known that I, WALTER V. TURNER, a citizen of the United States, residing at Edgewood, in the county of Allegheny and State of Pennsylvania, have invented new and useful Improvements in Emergency-Valve Devices, of which the following is a specification.

This invention relates to fluid pressure brakes, and more particularly to a brake equipment of the type adapted for normally operating the brakes by means of straight air and having an emergency valve device adapted to effect an emergency application of the brakes upon a sudden reduction in train pipe pressure, such as produced when a flexible hose bursts or the train breaks in two.

The present invention is in the nature of an improvement on the construction covered in my prior Patent No. 965,615, dated July 26, 1910 and the principal object is to simplify the construction, and provide an apparatus of few parts.

As in the case of the above mentioned patent, the present construction is of the type known as the two pipe system, in which there are only two pipe connections to the brake valve, namely, the automatic train pipe and the straight air pipe, the brake valve being adapted to connect the train pipe with the straight air pipe in one position, so that the immediate source of fluid for straight air operation is the automatic train pipe. An equipment of the above type also includes an emergency valve device for controlling the straight air and automatic admission and release of fluid to and from the brake cylinder and in the present construction, said valve device controls communication from the primary source of fluid under pressure to the automatic train pipe.

In the accompanying drawing; Figure 1 is a diagrammatic view of a combined straight air and automatic emergency brake equipment for a car, embodying my improvements; Fig. 2 a central sectional view of the improved emergency valve device, showing the parts in the normal release position; and Fig. 3 a similar view, showing the parts in emergency application position.

As shown in Fig. 1, the car air brake equipment may comprise a brake cylinder 1, an emergency valve device 2 connected to the train pipe 3, the straight air pipe 4, and the main reservoir pipe 5. The train pipe 3 and straight air pipe 4 lead to brake valves 6 located at opposite ends of the car and the main reservoir pipe 5 leads to a main reservoir 7 which is supplied with fluid under pressure by an air compressor 8.

The emergency valve device 2, as shown in Figs. 2 and 3 of the drawing, comprises a casing having a piston chamber 9 containing a piston 10 and a valve chamber 11 containing a slide valve 12. The main reservoir pipe 5 is connected by a passage 13 with valve chamber 11 and the piston chamber 9 is connected to train pipe 3 by a passage 14. The straight air pipe 4 is connected to a passage 15 leading to the seat of the slide valve 12 and in the normal release position of the valve, said passage is connected by a cavity 16 in said valve with passage 17 communicating with the brake cylinder 1. A spring 18 acts on piston 10 and tends to maintain the piston in its normal release position. A restricted feed port 19 is provided in the piston 10 to furnish communication from the piston chamber 9 to valve chamber 11, and passage 14 extends to the seat of slide valve 12 and contains a choke plug 20 for restricting the communication between the valve chamber 11 and the train pipe 3. The communication from the valve chamber 11 to the train pipe 3 is restricted so that the rate of flow from the main reservoir to the train pipe will be limited to a degree less than the maximum rate of flow from the train pipe through the brake valve and straight air pipe to the brake cylinder. The purpose of the above limitation of flow from the main reservoir to the train pipe is to prevent the pressure on the main reservoir side of the piston 10 from reducing at the same rate as the train pipe pressure when a sudden reduction in train pipe pressure is made; so as to insure the movement of said piston to emergency position.

In operation, fluid under pressure from the main reservoir 7 flows through pipe 5 and passage 13 to the valve chamber 11 of the emergency valve device and thence through the passage 14 and feed port 19 to the train pipe 3, charging the same to the standard pressure carried in the system. The fluid pressures on opposite sides of the piston 10 being equal, the spring 18 maintains the piston in the normal release position, as shown in Fig. 2. A straight air application of the brakes may be made by turning a handle of the brake valve 6 at one end of the car to straight air application position, in which the train pipe 3 is connected to straight air pipe 4. Fluid under pressure is then supplied from the train pipe to the straight air pipe and flows through passage 15, cavity 16 in slide valve 12, and passage 17 to the brake cylinder 1, thus effecting an application of the brakes and when the desired pressure is secured in the brake cylinder, the brake valve is turned to lap position. The brake cylinder pressure may be further increased by again turning the brake valve to straight air application position and then back to lap position or the brakes may be released by turning the brake valve to release position, in which fluid from the brake cylinder is released through the straight air pipe and an exhaust port in the brake valve. Upon a sudden reduction in train pipe pressure due to a flexible hose bursting or the train breaking in two, the reduction in pressure in piston chamber 9 causes the main reservoir pressure on the opposite side of the piston to shift the parts to emergency application position, as shown in Fig. 3, in which the brake cylinder passage 17 is uncovered by the movement of the slide valve 12 and fluid at main reservoir pressure from valve chamber 11 flows to the brake cylinder and thus produces an emergency application of the brakes. The brakes are released after an emergency application of brakes, when the exhaust of air from the train pipe is closed, upon equalization of fluid pressures on opposite sides of the piston 10 by flow of fluid from the main reservoir through the feed port 19 to the train pipe, the spring 18 then returning the piston to normal release position.

Having now described my invention, what I claim as new and desire to secure by Letters Patent, is:—

1. In a fluid pressure brake, the combination with a brake cylinder, train pipe, straight air pipe, and a source of fluid under pressure, of a brake valve having means for supplying fluid from the train pipe to the straight air pipe and a valve device operated by a reduction in train pipe pressure for closing communication through the straight air pipe to the brake cylinder and for supplying fluid to the brake cylinder, communication from said source of fluid pressure to the train pipe being open with the straight air pipe cut off from the train pipe.

2. In a fluid pressure brake, the combination with a brake cylinder, train pipe, and a source of fluid under pressure, of a straight air pipe, a valve device for controlling communication from the straight air pipe to the brake cylinder and from the source of fluid under pressure to the train pipe and operated upon a sudden reduction in train pipe pressure for supplying air to the brake cylinder to effect an emergency application of the brakes, and a brake valve for supplying air from the train pipe to the straight air pipe in one position and from the train pipe to the atmosphere in another position, said valve device being adapted to permit flow from the source of pressure to the train pipe in emergency application position with communication closed between the train pipe and the straight air pipe.

3. In a fluid pressure brake, the combination with a brake cylinder, train pipe, and a source of fluid under pressure, of a straight air pipe, a valve device for controlling communication from the source of fluid pressure to the train pipe and comprising valve means for controlling communication from the straight air pipe to the brake cylinder and a piston for operating said valve means upon a sudden reduction in train pipe pressure to supply air to the brake cylinder to effect an emergency application of the brakes, and a port for providing communication from one side of said piston to the other in the emergency position of the piston to thereby permit the release of the brakes upon equalization of fluid pressures, communication between the train pipe and the straight air pipe being closed.

4. In a fluid pressure brake, the combination with a brake cylinder, train pipe, and a source of fluid under pressure, of a valve device for controlling communication from the source of fluid under pressure to the train pipe and operated upon a sudden reduction in train pipe pressure for supplying fluid to the brake cylinder to effect an emergency application of the brakes, and means for automatically equalizing the fluid pressures on opposite sides of said valve device in emergency position to thereby permit the release of the brakes, communication between the train pipe and the straight air pipe being closed.

5. In a fluid pressure brake, the combination with a brake cylinder, train pipe, main reservoir, and means for charging the main reservoir with fluid under pressure, of a valve for controlling the admission of fluid to the brake cylinder, a piston subject to the opposing pressures of the main reservoir and train pipe for operating said valve, and a passage controlled by said valve for charging the train pipe by flow from the main reservoir side of the piston and having means for restricting the rate of flow from the main reservoir to the train pipe.

In testimony whereof I have hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."